United States Patent [19]

Weber

[11] 4,435,164
[45] Mar. 6, 1984

[54] DIDACTIC APPARATUS PROVIDING FOR TUTELAGE OF RESPONSES THROUGH INCULCATION

[76] Inventor: Harold J. Weber, 20 Whitney Dr., Sherborn, Mass. 01770

[21] Appl. No.: 76,480

[22] Filed: Sep. 17, 1979

[51] Int. Cl.³ .............................................. G09B 7/02
[52] U.S. Cl. .................................. 434/337; 434/201; 434/362; 434/343
[58] Field of Search ............... 434/169, 201, 325, 337, 434/338, 340, 343, 362, 335, 258

[56] References Cited

U.S. PATENT DOCUMENTS

| | | | |
|---|---|---|---|
| 2,586,234 | 2/1952 | Kopas | 434/343 |
| 3,070,904 | 1/1963 | Saba | 434/338 |
| 3,252,230 | 5/1966 | Donev | 434/201 X |
| 3,314,165 | 4/1967 | Shreck et al. | 434/343 |
| 3,350,793 | 11/1967 | Bushnell | 434/337 |
| 3,508,349 | 4/1970 | Gilden et al. | 434/335 |
| 3,541,700 | 11/1970 | Montgomery | 434/325 |
| 3,861,063 | 1/1975 | Elsner | 434/337 |
| 3,973,334 | 8/1976 | Sterritt | 434/258 |
| 4,012,852 | 3/1977 | Journet et al. | 434/362 |
| 4,085,523 | 4/1978 | Duncan | 434/201 X |

FOREIGN PATENT DOCUMENTS 2427371 12/1974 Fed. Rep. of Germany ...... 434/343

Primary Examiner—William H. Grieb

[57] ABSTRACT

My present invention relates to didactic apparatus as particularly adapted to the tutelage of mathematical fundamentals, multiple choice statements, and the like. A set of inexpensive instructional problem or "flash" cards is prepared for the student for use in conjunction with, and as an essential part of my invention. Each interrogative card in the set contains a problem statement in student readable form, together with a machine readable cryptogrammic answer for the problem. As each problem card is methodically inserted into my didactic machine, the machine elements interpret the answer cryptogram, while the instructional problem remains visable to the student. The student summarily provides a response by inserting his separately selected answer elements from another set of answer cards which, in a way similar to the problem cards, have the plainly visible response elements clearly inscribed on each card, together with a machine readable code or cryptogram for each response element. As the answer cards are individually inserted into the machine operator, the answer card cryptograms are electronically compared with the problem card cryptogram and should they match, it means the student has entered the correct answer resulting in a student "correct answer" signal. Conversely, a non-coincident match may produce a "wrong answer" signal. Further embodiments of my invention include trial advance, scorekeeping, "answer too big" or "answer too small" visual indications, and sonant indications.

19 Claims, 22 Drawing Figures

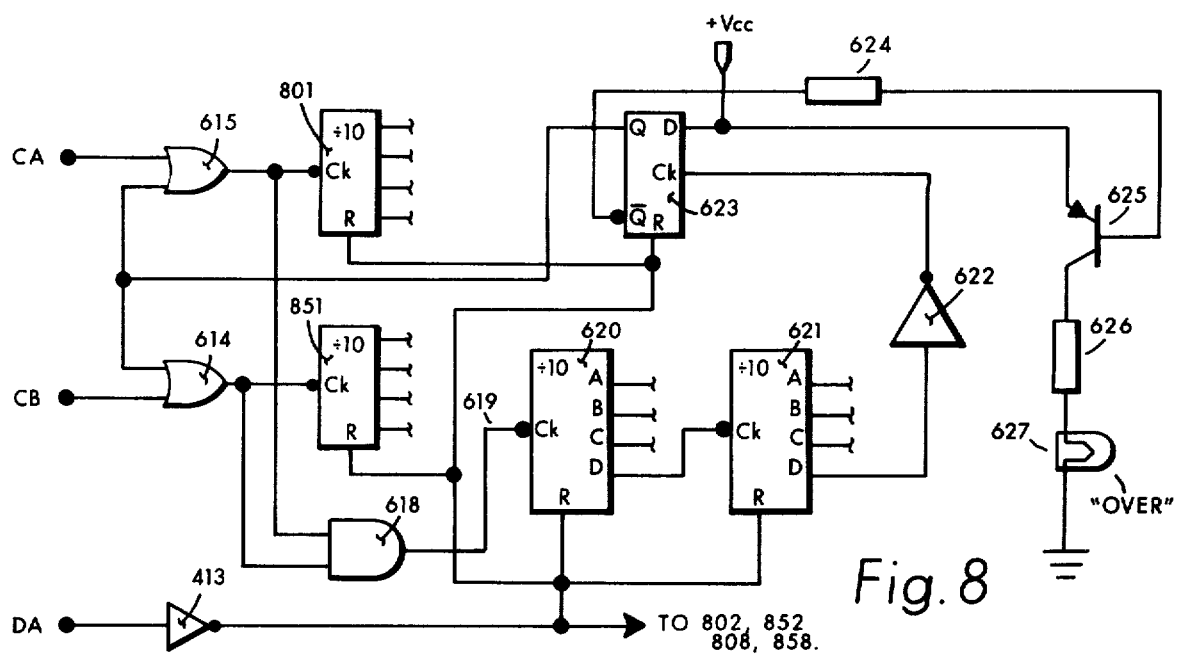
Fig. 8
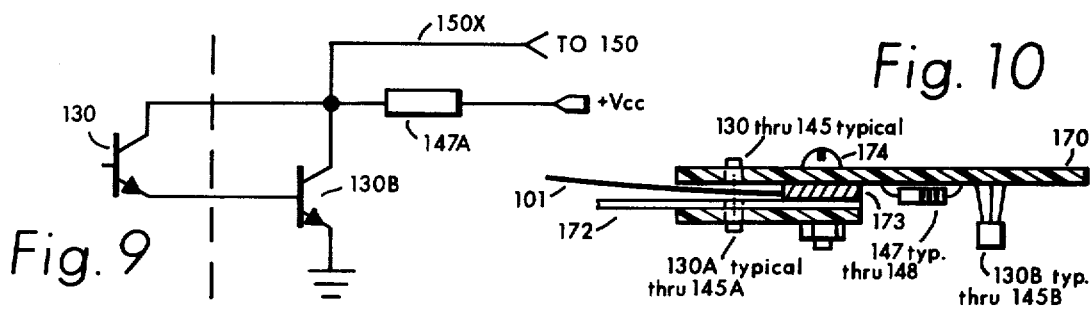
Fig. 9
Fig. 10
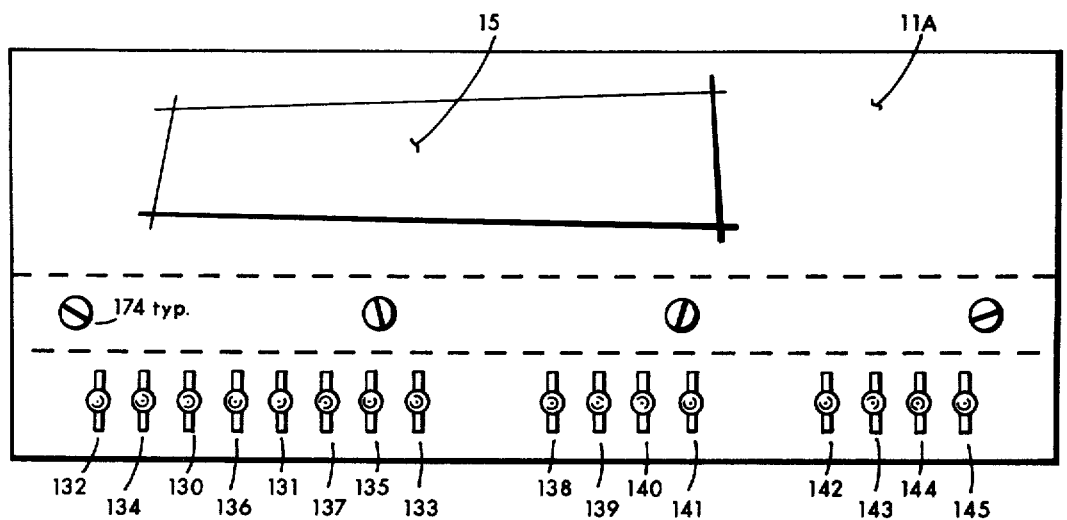
Fig. 11

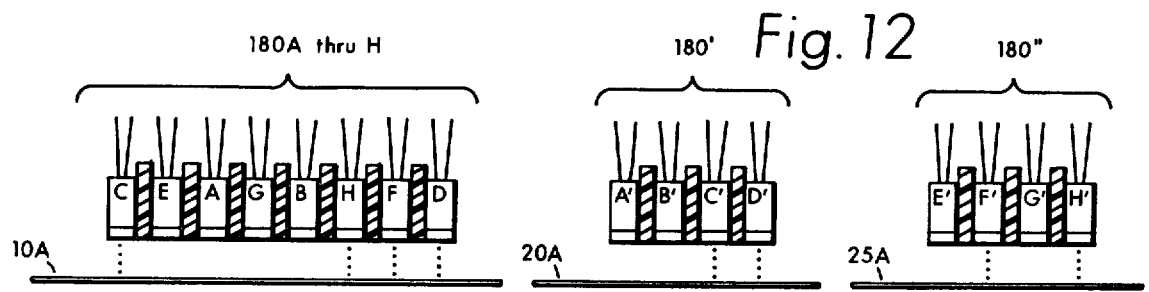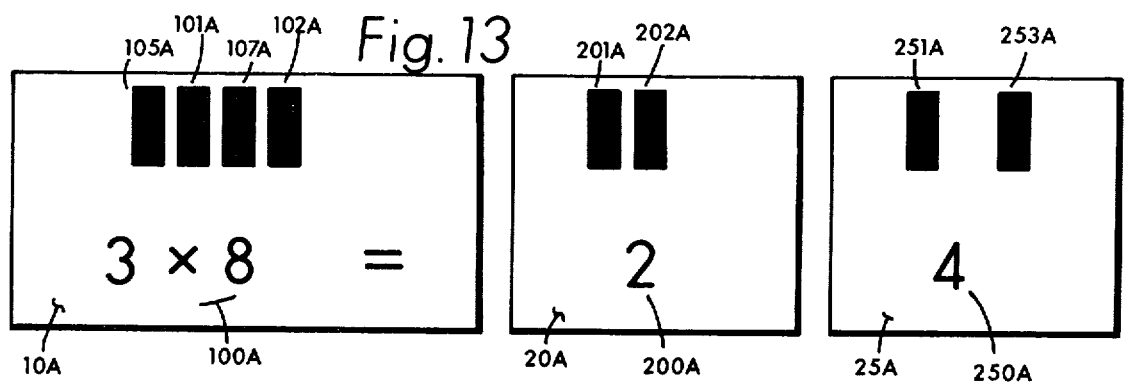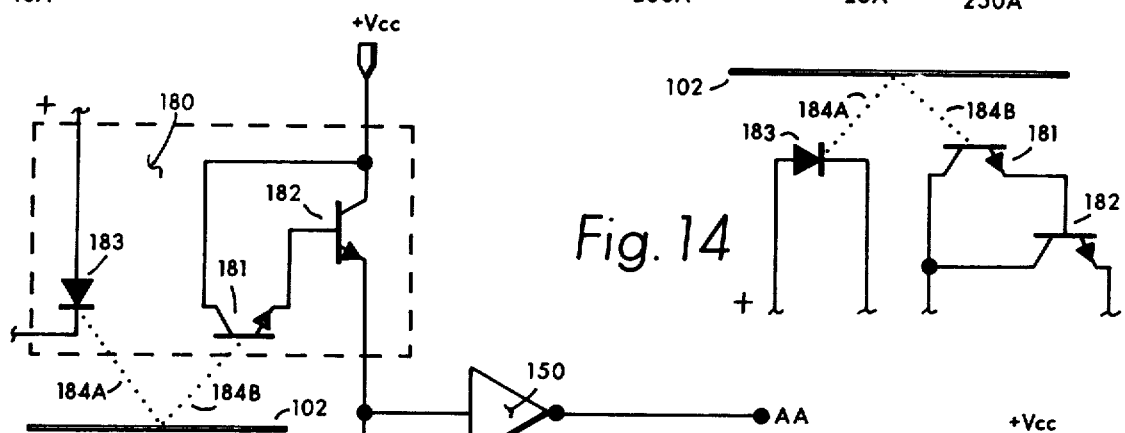

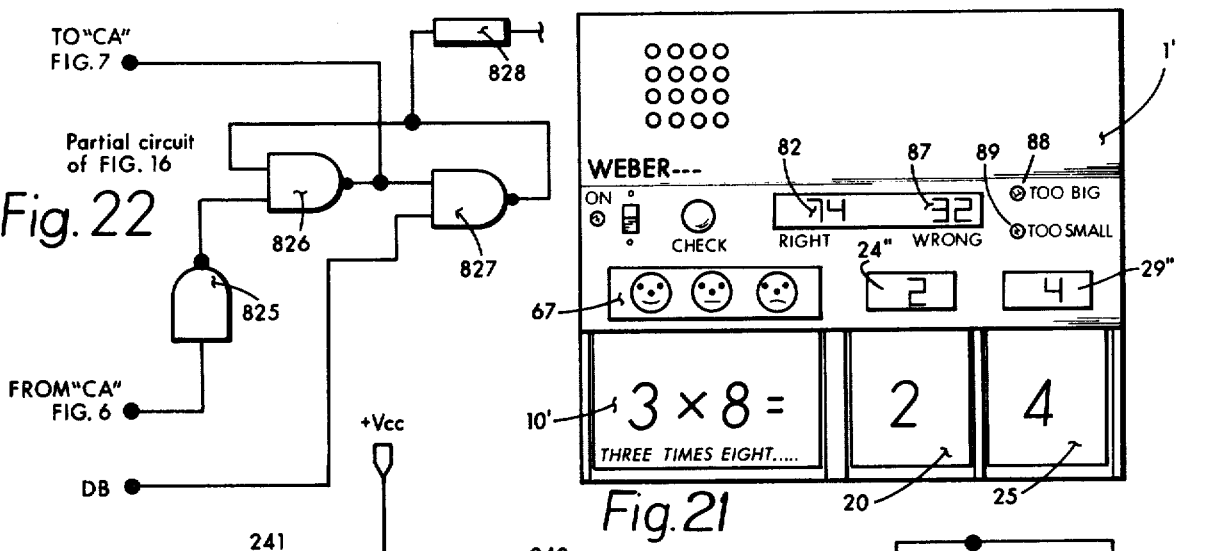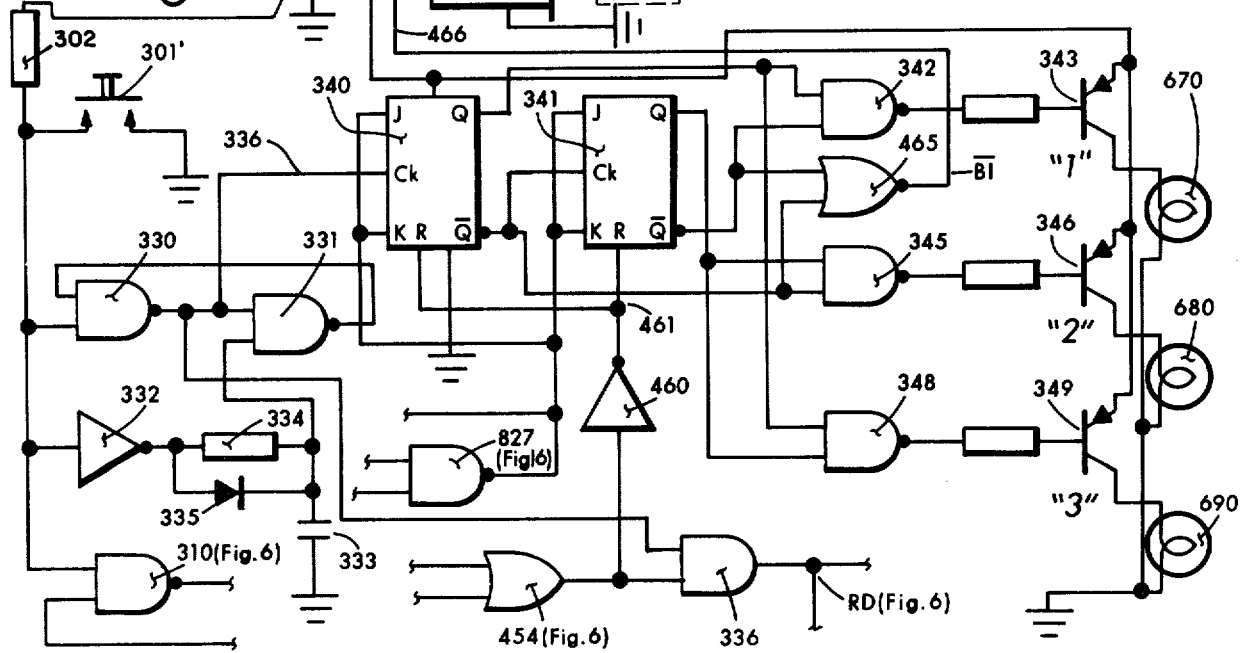

DIDACTIC APPARATUS PROVIDING FOR TUTELAGE OF RESPONSES THROUGH INCULCATION

SUMMARY

My new invention finds application in the field of teaching the fundamentals or principles of a skill such as mathematics. In the particular field of mathematics, for example, the principles such as the multiplication tables require repetitive drilling to inscribe them into a student's memory. Thus it is a purpose of my new invention to provide for a method and means for drilling, or tutoring, a student through the use of a novel didactic machine with such tutoring inherently including a high degree of student interaction with the machine. This is believed to accomplish improvement over those methods which have hitherto been brought forth. This "man-machine" interaction is provided for through the use of a set of inexpensive printed problem or "flash" cards, with the cards both providing the student with a legible problem and the didactic machine with a coded or cryptogrammic answer for the ultimate comparison with the student's subsequently, and separately, entered answer element cards. My new invention is novel in that it significantly improves over any prior methods which employ apparatus to internally generate and display a problem and allow for the student to enter his answer by means such as a keyboard. These prior methods are less interactive, in the sense of participation by the student, as the problem is "generated" by the machine and an impersonal keyboard entry is made for the trial answer. In my invention in its preferred form, the student or his mentor may set up a prearranged group of problem cards with which the student needs the most drill practice, where-as prior machines have predescribed or random routines obliging the student to drill with many problems outside his needs; thus tending to either bore, or else over-extend, the student, thereby resulting in a negative teaching effect.

My invention further provides for the student to insert his answer in the form of individual printed answer element cards, with each card requiring independent insertion into the didactic machine receptor and, in effect, requiring the "construction" of an answer. This separate acting manual insertion of the several response components is believed to provide a new found strong interaction between the student and the teaching machine. What is perhaps more important in the everlasting effect the distinct, boldly displayed answer elements appearing on the selected answer card have on the student's memory retention. The necessity to sort out the correct answer elements from the answer card set brings about increased concentration and thereby embeds the resulting answer into memory much more effectually than more casual keyboard or like response means are likely to accomplish.

My new invention employs apparatus which, in one form, provides for the cooperative insertion of a prepared mathematical problem card. Upon insertion, the machine sensors read the answer cryptogram contained on the problem card, while providing for easy readability of the mathematical (or like) problem by the student. Upon reading and considering the plainly displayed problem, the student will select the suitable answer card or cards from the answer card set. Normally each answer card contains, for example, a single answer element such as a single numerical digit, say "zero" through "nine", allowing for plural answer cards to be employed for multidigit answers in a side-by-side arrangement. Upon insertion of the answer cards by the student, the machine sensors will read the correspodent answer cryptogram on each answer card. In my described embodiment, the student will next proceed to test his answer by activating a "check" switch. This will enable the logic processing unit to compare the correct answer as appearing on the problem card cryptogram with that of the student's proposed answer, as contained on the selected answer card cryptograms. If the answers prove to match, the student is correct and a scorekeeping means will advance one point on the "RIGHT" display. On the other hand, if the answers do not match, the student is considered to be incorrect and a scorekeeping means will advance one point on the "WRONG" display. In addition, a "WRONG" answer will be further elaborated upon by two separate indicants showing that the student's chosen answer is either "TOO LARGE" or else "TOO SMALL". The coincident removal of the problem and the answer cards sets up the machine for the next problem card entry and advances an accumulating score tally. The insertion of a special key coded "reset" problem card clears the tally score and resets the machine functions to "zero". I further show that, through the mixed organization of the answer cryptogram indicia as it appears on the problem card, the student is discouraged from being tempted to "beat the machine" by matching cryptograms. The cryptogrammic answer coding provided on the problem and the answer cards is shown to be produced in several ways, including punched aperature patterns and printed-on indicia.

DESCRIPTION OF DRAWINGS

Ten sheets of drawings, containing twenty-two figures, serve to illustratively describe the essence of my new invention, as:

FIG. 8—Schematic connection for a particular length of test control circuit arrangement.

FIG. 9—Schematic for an alternative photoreceptor connection.

FIG. 10—Sectional view showing photoreceptor and illuminator interaction with tester card means.

FIG. 11—Circuit board arrangement for photoreceptors.

FIG. 12—Arrangement for retroreflective photo-sensors.

FIG. 13—Tester card arrangement for use with retroreflective photo-sensors.

FIG. 14—Photosensor arrangement for retroreflective response.

FIG. 15—Retroreflective photosensor circuit arrangement for accomplishing preferred functional electrical signal polarity sense.

FIG. 16—"Correct Answer" indicator driver circuit.

FIG. 20—Trial answer entry and reproof display control circuit.

FIG. 21—Frontal view of a particular machine embodiment including trial answer reproof elements shown as happy face displays and correct answer display.

FIG. 22—Circuit detail adjunct for FIG. 6 and FIG. 16 to forestall multiple tally entries from the same correct answer response.

DESCRIPTION OF INVENTION

Figure 1:
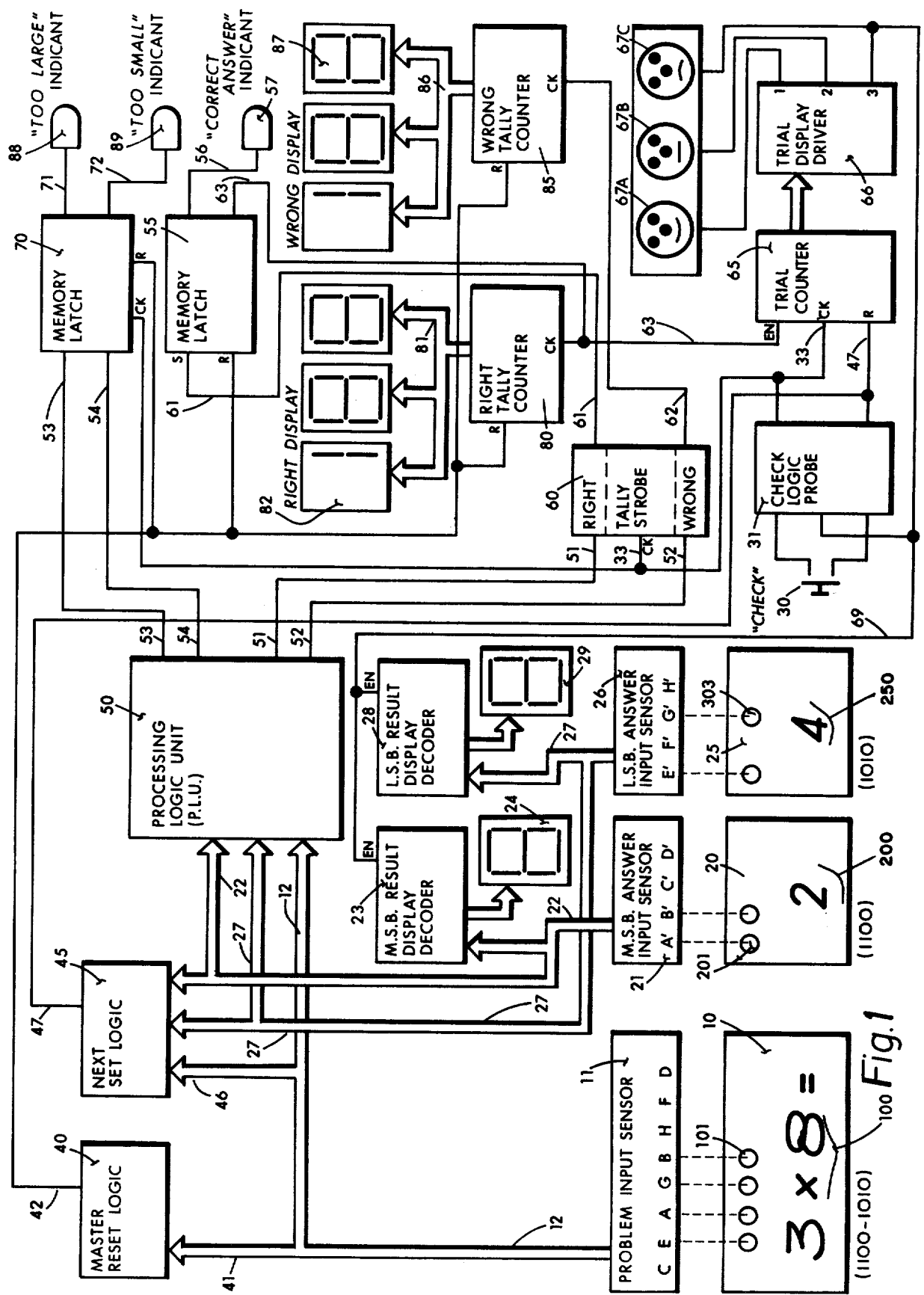
FIG. 1—Shows the signal flow block diagram for the didactic apparatus.

A block diagram for a preferred embodiment which my didactic device may take is shown in FIG. 1. A problem card 10 is shown which is printed or otherwise prepared to present a first symbolic stimuli 100 which, in this example, is shown to be the mathematical problem "3 times 8". The problem card 10 has a machine readable first code identity sequency of aperatures or marks 101 appearing so as to cryptogrammicly represent the correct answer to the said problem, which again in this cited example is "2 4". I further show that in my preferred embodiment the following weighted binary code variation is employed:

| No. | Bit A | Bit B | Bit C | Bit D |
|-----|-------|-------|-------|-------|
| 0 | 1 | 0 | 0 | 0 |
| 1 | 0 | 1 | 0 | 0 |
| 2 | 1 | 1 | 0 | 0 |
| 3 | 0 | 0 | 1 | 0 |
| 4 | 1 | 0 | 1 | 0 |
| 5 | 0 | 1 | 1 | 0 |
| 6 | 1 | 1 | 1 | 0 |
| 7 | 0 | 0 | 0 | 1 |
| 8 | 1 | 0 | 0 | 1 |
| 9 | 0 | 1 | 0 | 1 |

The use of this, or an equal, code is preferred in the practice of my invention because it shows a two level binary indication for all digit combinations, including zero. For example, zero which is represented by code logic (0000) in the conventional BCD or 1-2-4-8 binary code appears as the unique combination logic (1000) in this weighted code format. In addition the reversibly symmetrical code combination (1101 1011), when appearing on the problem card 10, serves as a "master reset".

When the problem card 10 is inserted into the cooperative input sensor 11, a binary code is read from the said problem card 10 which represents the ANSWER for the problem. As in my shown example, the problem 100 is "3 times 8", with the result that the answer "2 4" appears on the card as weighted binary (1100 1010). This is read as a functional electrical signal through providing a hole or aperture 101 in the problem card to represent a binary logic (1), while a non-hole condition appears as a logic (0). Furthermore as is shown in my preferred embodiment, the input sensor station is arranged in a mixed binary sequence as in this example (CEAGBHFD) from left to right. The code appearing on the problem card, to represent the exampled answer "2 4" becomes (01111000) in this mixed format. This is pretty hard to mentally decipher as the numerical code (11001010) represented by the earlier stated weighted binary signal states for the answer "2 4".

The answer cards 20, 25 each serve to support a second symbolic stimuli, or visual answer element, which in this example is shown to be the answer digits "two" 200 and "four" 250 and which are cryptogrammicly entered as a second code identity into the most significant bit result input sensor station 21 and the least significant bit result sensor station 26 respectively through aperatures as 201, 303, etc. representing binary (1) bits as in the example for the said problem card sensor station 11. In my modelled device the M.S.B. result entry is (A'B'C'D') while the L.S.B. result entry is (E'F'G'H').

The problem sensor station output 12 provides an input 41 to the master reset logic 40. Although this reset logic may be programmed to recognize many code variants, my preferred model is shown to respond to a symmetrically repeating code (1101 1011), which uses four-bit code groups not recognizable as valid numeral digits. The purpose for the master reset is to cause all functions of the machine to initialize ready for the start of a problem series. This initializing or master reset function is accomplished by reset control line output 42.

The problem sensor output 12 also provides an input 46 to the next set logic 45, together with inputs from the said M.S.B. sensor output 22 and the said L.S.B. sensor output 27. The purpose for the next set logic is to set-up the said didactic machine for the next problem entry in a series. This is accomplished by having the said next set logic 45 recognize the withdrawal of the problem card 10 and both answer cards 20, 25 from the machine. The withdrawal of all the cards causes all inputs to be high, logic (1) resulting in an input:

| PROBLEM | MSB RESULT | LSB RESULT |
|---------|------------|------------|
| (1111-1111) | (1111) | (1111) |

This "next set" function is accomplished by reset control line 47.

The M.S.B. and L.S.B. input sensor outputs also couple by way of respective lines 22 and 27 to correspondent display decoders 23 and 28. The purpose for the display decoders is to provide a visual display 24 for the MSB entry and a visual display 29 for the LSB entry as reassurance to the wary or skeptical student that the machine is indeed reading the inserted answer cards 20, 25 correctly.

All three said input sensor 11, 21, 26 output lines 12, 22, 27 input into the processing logic unit (P.L.U.) 50. The purpose is to compare the said problem sensor output 12 with the two result sensor outputs 22, 27. If a match is made, signifying that the student has entered a correct answer, an output 51 from the said P.L.U. 50 will operatively connect to the tally strobe 60 "right" input.

Conversely, should the student insert a wrong answer, an output 52 from the said P.L.U. 50 will operatively connect to the tally strobe 60 "wrong" input. In addition, if the trial answer is too big, an error signal will output 53 from the P.L.U. 50 to memory 70. On the other hand, should the trial answer be too small, an error signal will output 54 from the P.L.U. 50 to memory 70.

After the student is satisfied with the answer he has selected and subsequently entered with the said cards 20, 25, the "CHECK" switch 30 is momentarily closed by the student's action. The result of the switch 30 on the check logic strobe 31 is to cause the said strobe logic 31 to latch-up and output from line 33 a brief pulse which feeds to the tally strobe 60, the trial counter 65, and the memory latch 70. Further depressing of the said switch 30 is ineffectual until the "next set" logic 45 input signal conditions have been met as described earlier, whereupon a "next set" reset pulse will occur on line 47. The single pulse from the check logic strobe 31 results in either the signal on line 51 or else on line 52 outputing on lines 61 or 62 respectively. An output on line 61, indicative of a "correct" student response, will serve to SET the memory latch 55. The result is twofold: first, the "CORRECT ANSWER" indicant 57 will be energized by line 56; and secondly, a signal will emerge on line 63 which will serve to advance the RIGHT COUNTER 80 and the RIGHT DISPLAY 82 by one count. The same signal on line 63 is also coupled to and serves to disable the TRIAL COUNTER 65. Otherwise an output on line 62, indicative of an incorrect student response will serve to advance the WRONG COUNTER 85 and the WRONG DISPLAY 87 by one count. The said single clock pulse also acts upon memory 70 clock input so as to transfer and hold the input 53, 54 conditions to the respective output 71, 72 resulting in either a "TOO BIG" indicant 88 signal or else a "TOO SMALL" indicant signal 89, depending upon the conditions present on the said P.L.U. 50 outputs 53, 54.

The progressive advancement of a TRIAL COUNTER 65 is brought about by the clock pulse 33 generated by the check logic strobe 31. Therefore each time the student "tests" an answer to a particular problem, the trial counter advances by "one" count. If the answer is RIGHT the enable line 63 will jam, resulting in no more advance for the trial counter. The trial counter appears, in the modelled embodiment, as a "divide-by-four" counter: the counts are 0-1-2-3. The trial display driver 66 couples to the counter and produces no output when the counter is reset 47 to zero. When it advanced to one, as by the first answer check, the "happy" happy-face display 67A will light up. On the second attempt, the "straight" happy-face 67B will light up, whereas three attempts will light up the "sad" happy-face 67C. The result is a mild admonition to the student if two, or three, attempts are needed to answer the problem.

Figure 2:
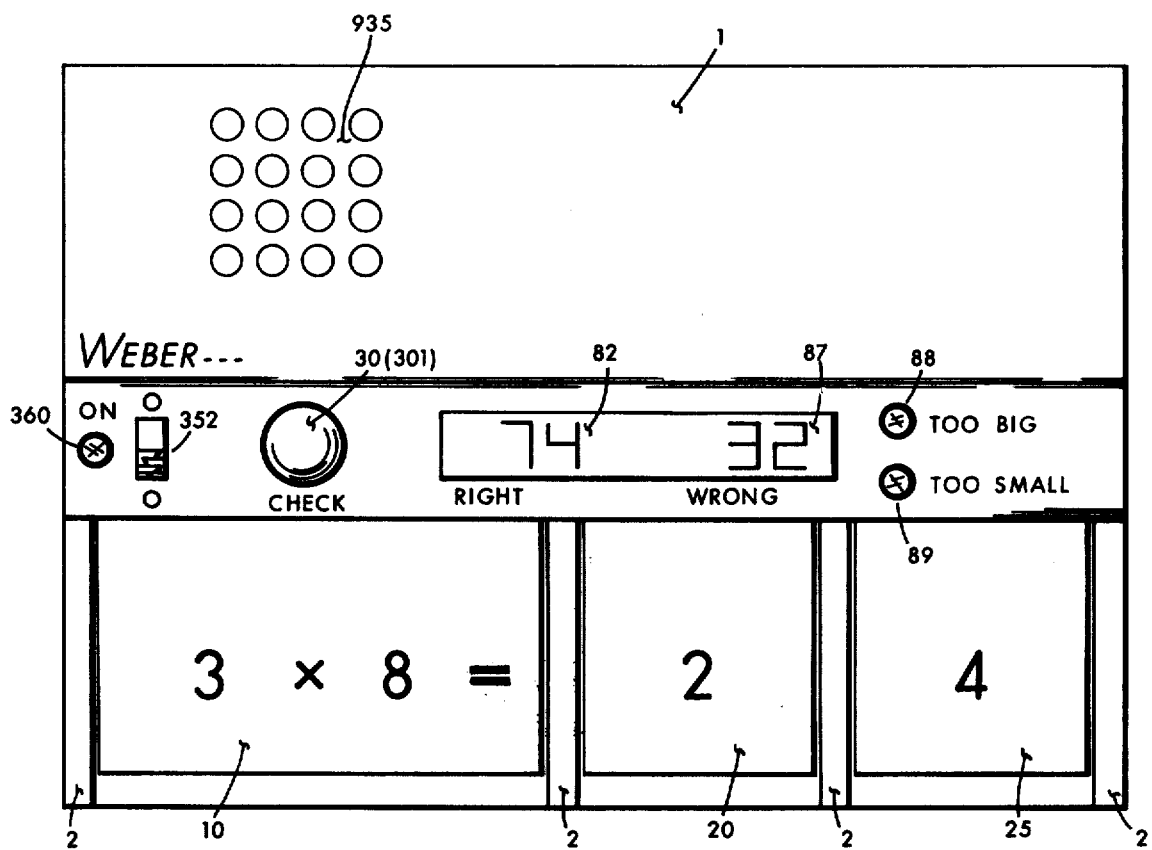
FIG. 2—Shows a student view for the control position of the didactic apparatus.

FIG. 2 is an illustrative view of my preferred embodiment for the didactic device as herein described. A case 1 serves as a housing to both protect and make operatively convienent the various elements which comprise my teaching apparatus. The housing as shown is much as it would appear from the student's operating position, looking down upon the machine. The device is about 23 centimeters wide by about 16 centimeters deep, standing a maximum of about 6 centimeters above the work table surface. The problem card 10, together with the correct answer cards 20, 25 are also shown. The cards are positioned by guides 2. Also shown is, from left to right, the power-on indicator lamp 360; power switch 352; "CHECK" switch 30; sonant indicator 935; "RIGHT" answer tally display 82; "WRONG" answer tally display 87; "TOO BIG" indicant 88; and "TOO SMALL" indicant 89.

Figure 3:
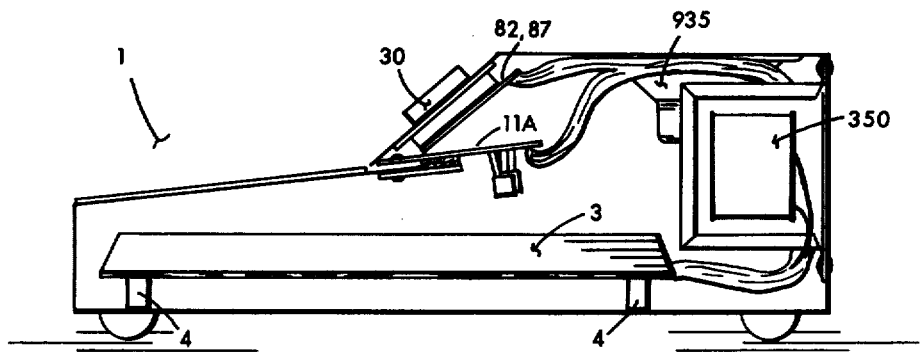
FIG. 3—Shows a skeletal side view of the apparatus in one particular embodiment.

FIG. 3 is a side view of my preferred didactic machine embodiment showing the internal arrangement for the various essential elements which makeup the said machine. The housing 1 contains an electronics circuit board or printed circuit assembly 3 mounted to the case 1 bottom by spacers 4. Also shown is the position of the power transformer 350; loudspeaker 935; "CHECK" switch 30, displays 82, 87; and the input sensor circuit board 11A.

Figure 4:
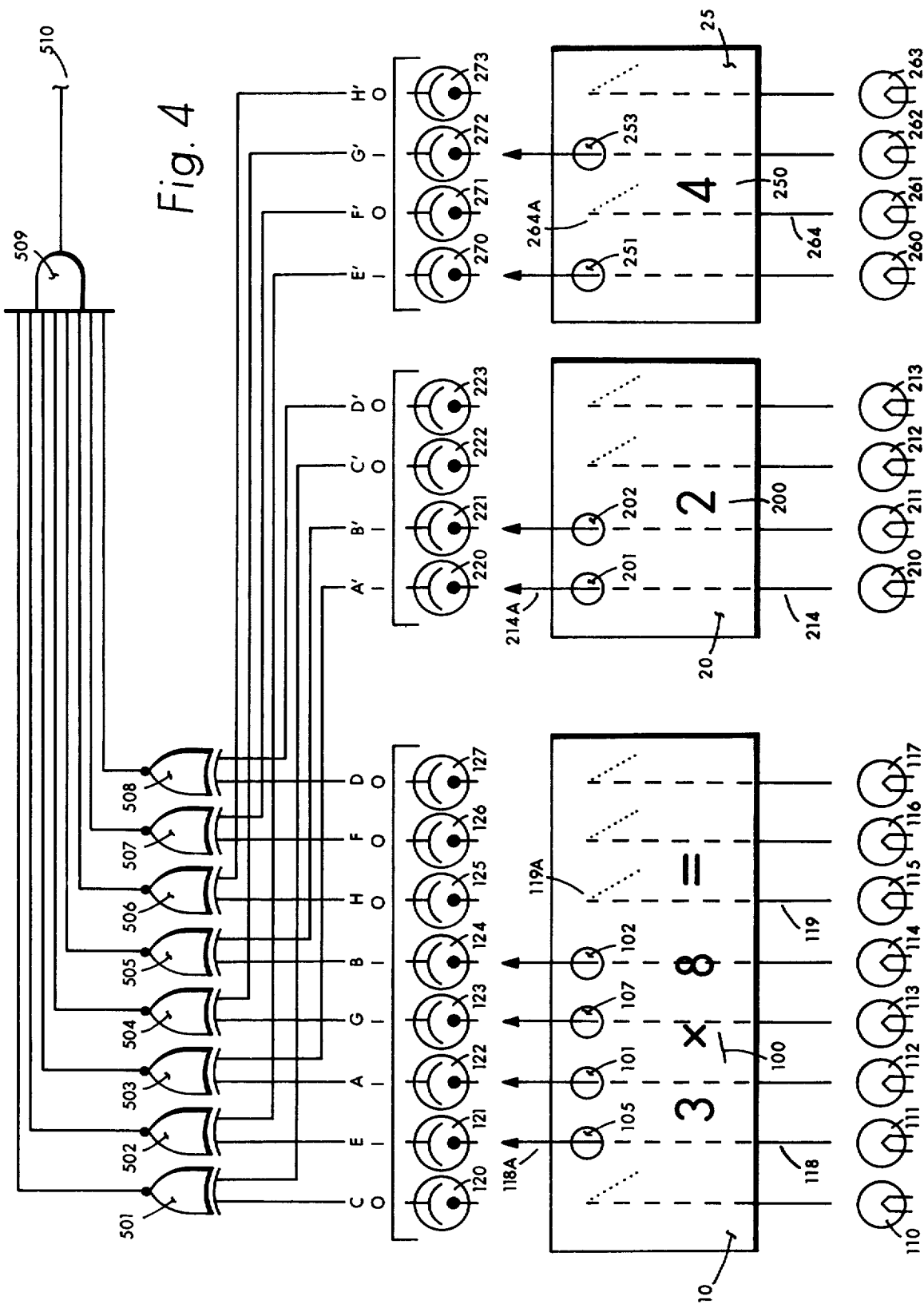
FIG. 4—The arrangement of the photoreceptor and illuminators are shown in relation to the tester cards.

FIG. 4 is an essential circuit diagram illustrating the principal components comprising the answer checking functions for my didactic device. Light sources 110 through 117; 210 through 213; and 260 through 263 serve to illuminate respective photoreceptors or phototubes 120 through 127; 220 through 223; and 270 through 273. The illumination path, as for example 118, is through an aperature, as for example: 101, 102, 105, 107 in the problem card 10; and like holes: 201, 202, 251, 253 in the answer cards 20, 25. In a like manner, light from some sources, as for example source 119, arrives at, but can not pass through, the said card 10 because no aperature hole is present, whereupon it is deflected 119A, and is thus effectively prevented from arriving at the respective phototube which in this case is represented as said receptor 125. The particular model herein described recognizes a hole as a "high" logic (1), whereas a blockage or no-hole condition is a "low" logic (0). The holes in the problem card 10 correspond to the correct answer code for the problem 100 printed thereupon. The answer code is a logic (1100-1010) but appears on the card in this example as a logic (01111000) because the said phototubes comprising my input sensor are arranged in a mixed (CEAGBHFD) sequence in an effort to discourage the inevitable mental association of the binary grouping on the problem card with the grouping on the unknown answer cards. The outputs from the plural said phototubes are operatively inputted into a processing logic unit consisting of correlator, or EXCLUSIVE-NOR, gates 501 through 508. The truth table for the said correlator gates is:

| $A_{in}$ | $B_{in}$ | OUT |
|---|---|---|
| 0 | 0 | 1 |
| 0 | 1 | 0 |
| 1 | 0 | 0 |
| 1 | 1 | 1 |

Therefore a match in the (CEAGBHFD) problem card inputs with the (A'B'C'D' E'F'G'H') inputs from the answer cards will result in a logic (1111 1111) as inputed to AND gate 509 from the said EXCLUSIVE-NOR gates 501 through 508. Thereupon a logic (1) appears at output 510 when the answer is CORRECT, whereas a logic (0) will appear whenever the answer is WRONG.

Figure 5:
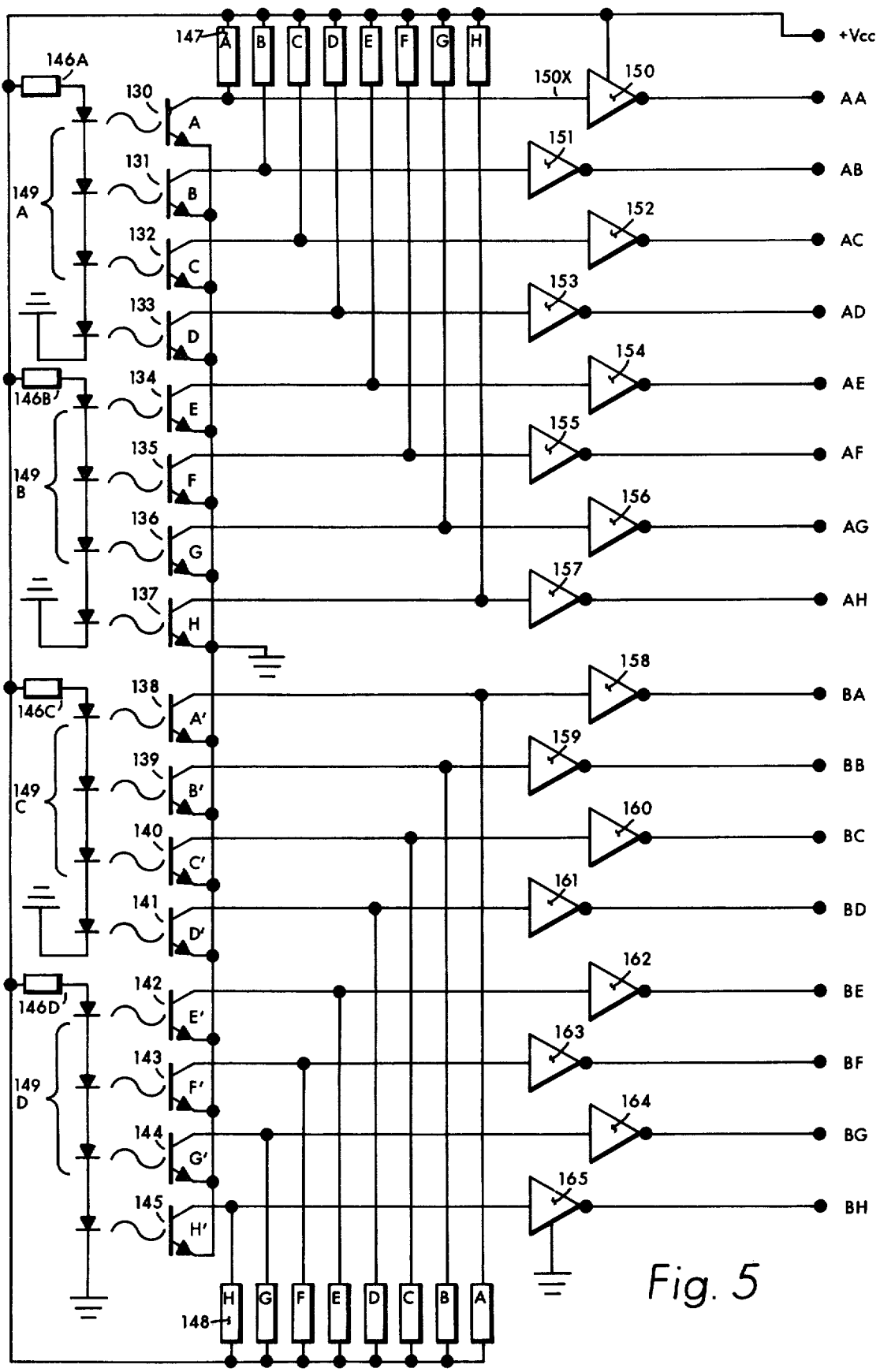
FIG. 5—Schematic connection for sensor means using semiconductor device photoreceptors and illuminators.

FIG. 5 is the circuit diagram for the input sensor portion of the preferred embodiment for my didactic device which I have modelled. Sixteen light emitting diodes arranged in four groups 149A, 149B, 149C, 149D are operative through ballast resistors 146A, 146B, 146C, 146D to illuminate the bases of phototransistors 130 through 145 comprising the problem and answer card aperature readers (ABCD EFGH) and (A'B'C'D' E'F'G'H'). The said phototransistors are operative in conjunction with collector pullup resistors 147A through H, 148A through H to input buffer inverters 150 through 165 resulting in outputs AA, AB, AC, AD, AE, AF, AG, AH and BA, BB, BC, BD, BE, BF, BG, BH. Operation is such that, as for example in the "A" channel, the light arriving through a problem card aperature at phototransistor 130 will cause the said phototransistor to turn-on or conduct, pulling the input line 150X to inverter 150 to a logic (0) state, resulting in an inverted logic (1) at the AA output. Alternatively, if the light to phototransistor 130 is blocked by the problem card (e.g., no aperature) the collector will be pulled up to a logic (1) state, resulting in a logic (1) on the input line 150X to inverter 150, and further resulting in an inverted logic (0) at the AA output.

Figure 6:
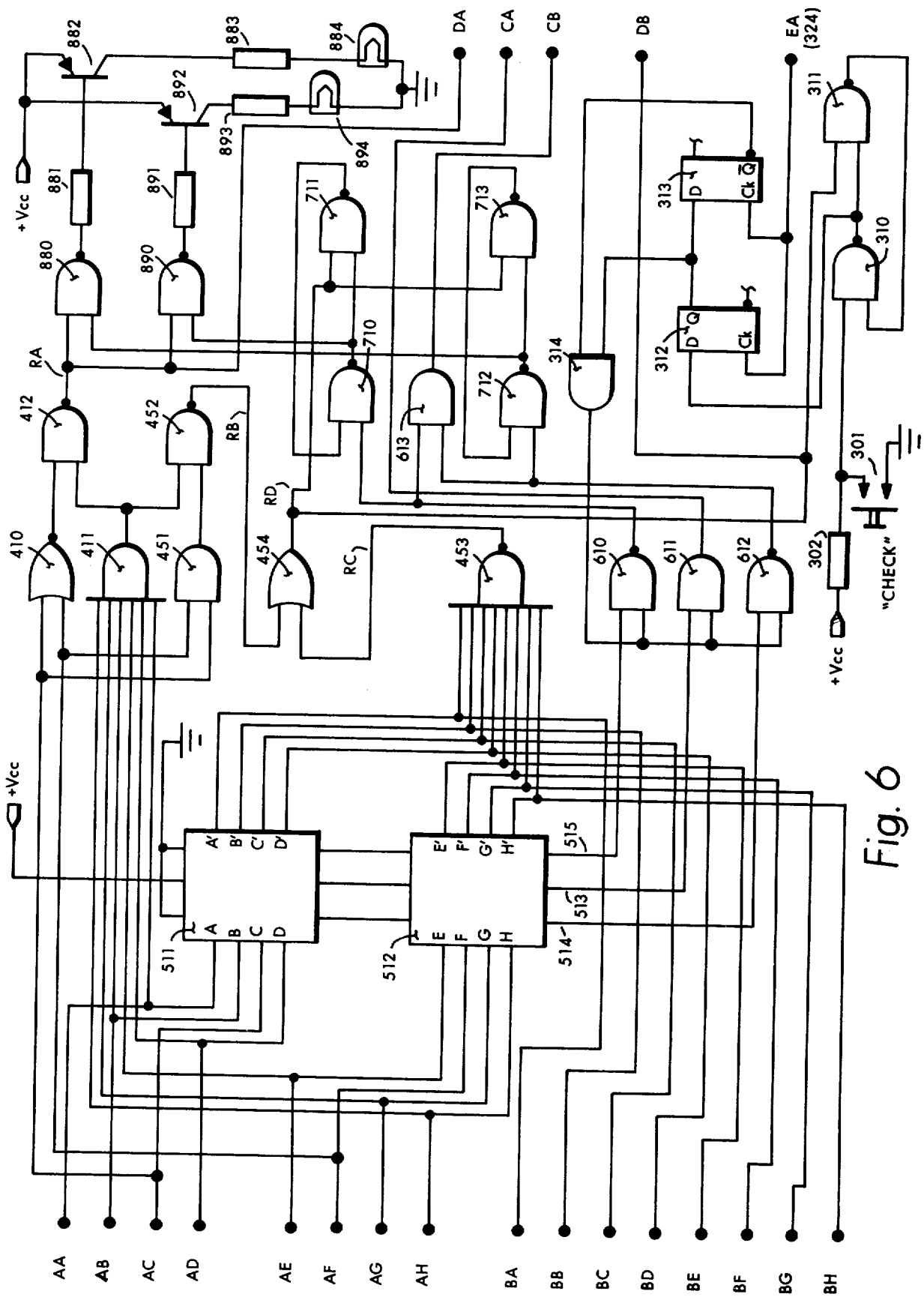
FIG. 6—Schematic connection for a particular processing logic unit embodiment.

FIG. 6 is the circuit diagram for the processing logic unit, set and reset logic, check logic, memory latches, tally strobe, and clock portions of my preferred embodiment for the modelled didactic device. Inputs AA through AH, BA through BH are provided by the input sensor means described in association with FIG. 5. The inputs AA, AB, AC, AD are connected to the A, B, C, D inputs of M.S.B. binary comparator 511. Accordingly, the inputs BA, BB, BC, BD are connected to the A', B', C', D' inputs of the said comparator 511. The remaining inputs AE, AF, AG, AH and BE, BF, BG, BH are connected respectively to the inputs E, F, G, H and E', F', G', H' of the L.S.B. comparator 512. Furthermore the A<B, A>B inputs of said comparator 511 are grounded, whereas the A=B input is held HIGH. Accordingly the A<B, A>B, A=B outputs of comparator 511 are operatively connected to the corresponding inputs on comparator 512 as is usual practice for cascading such logic devices. The A=B output 513 inputs to AND gate 611, while the A<B output 514 and the A>B output 515 are connected to NOT-AND gates 610, 612. Initialization, or master reset, is accomplished by the gates 410, 411, 412 producing a master reset condition logic (0) at the output of gate 412 denoted as RA. This is accomplished for the aforementioned master reset input logic condition (1101 1011). The six logic (1) states are combined in the AND gate 411 to produce a logic (1) at the respective connection to NAND gate 412. In a like manner the two logic (0) states on lines AC, AF are combined in NOT-OR gate 410 to produce a logic (1) at the respective connection to NAND gate 412. The logic (11) on the input of NOT-AND gate 412 results in a logic (0) at the output RA and output DA. Next set logic is acheived when the problem and all answer cards are withdrawn resulting in a logic (1) on all inputs AA through AH, BA through BH. The AA, AB, AD, AE, AG, AH inputs combine in AND gate 411, while the remaining AC, AF logic (1) states combine in AND gate 451. This results in a logic (11) condition on the input of NAND gate 452 resulting in a logic (0) on line RB. Accordingly the BA through BH logic (1) conditions combine in NAND gate 453 producing a logic (0) at the output RC. The result is a logic (00) on the input of OR gate 454 producing a logic (0) on the output RD and also output DB. The purpose of the next set logic is to initialize the memory latches consisting of interconnected gates 710, 711 and gates 712, 713. The next set logic also resets the memory latch 310, 311 in the check logic strobe subcircuit. The result is the inputs to NAND gates 880, 890 from respective latch gates 712, 710 are logic (0) resulting in an unconditional logic (1) on the outputs of gates 880, 890 thereby producing no base current for PNP transistors 882, 892.

Upon the student's depressing the "CHECK" switch 301 a logic zero on the input of latch gate 310 will change the state of the flip-flop, resulting in a logic (1) state on the "D" input of flip-flop 312. The edge triggered "D" flip-flop (for example, CD-4C13) 312 will transfer the logic (1) input to the Q output on the very next clock pulse EA (from 324) positive edge transistion. The result is a logic (11) on the input of AND gate 314. Accordingly, on the second clock pulse on the input of "D" flip-flops 312, 313 the Q output of 312 as it appears on the DATA, or "D", input of the second flip-flop 313 will transfer to the Q output of 313 causing the Q̄ output to drop to logic (0) thus disabling gate 314. The result is that a singular logic (1) pulse the width of which is equal to the cycle period of the clock pulses is produced at the output of AND gate 314. This strobe pulse is connected to the corresponding inputs of gates 610, 611, 612. One and only one of the three gates will be enabled with a logic (11) condition. If the A=B line 513 is logic (1) gate 611 will enable thereby producing a single strobe pulse width logic (1) output on TALLY RIGHT line CA. In a like manner, if A<B line 514 is logic (1) gate 612 will enable thereby producing a single strobe pulse width logic (0) on the corresponding input of gates 613 and 712. The result is a single logic (0) pulse on the TALLY WRONG output line CB together with the state change of the memory latch comprised of gates 712, 713 resulting in a logic (11) on the input of gate 880, a logic (0) state on the output of gate 880, and a resultant turn-on of the "TOO BIG" indicant lamp 884 by transistor 882, base resistor 881, and ballast resistor 883.

Should the A>B line 515 be logic (1) gate 610 will enable producing a single strobe pulse width logic (0) on the corresponding inputs of gates 613 and 710. The result is a single logic (0) pulse on TALLY WRONG output line CB together with the state change of the memory latch comprised of gates 710, 711 resulting in a logic (11) on the input of gate 890, a logic (0) state on the output of gate 890, and a resultant turn-on of the "TOO SMALL" indicant lamp 894 by transistor 892, base resistor 891 and ballast resistor 893.

Figure 7:
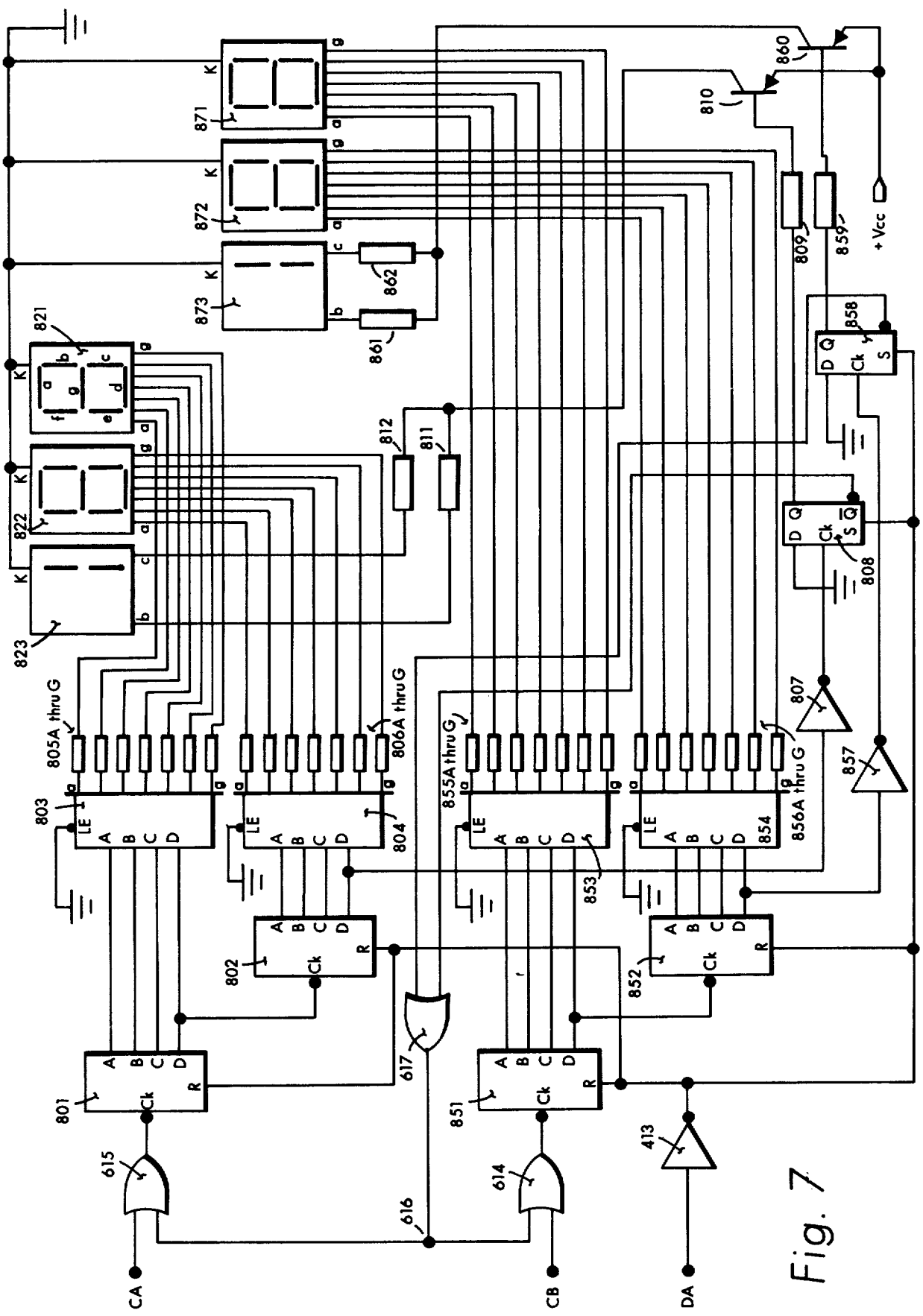
FIG. 7—Schematic connection for a particular scorekeeping arrangement.

FIG. 7 diagrams the scorekeeping circuits employed in my preferred embodiment. The tally right input CA results in a logic (00) on OR gate 615, therefore producing a logic (0) pulse on the CLOCK input of L.S.B. decade counter 801. The counter advances by one count on the negative edge of the said clock pulse. The L.S.B. counter is cascaded with a M.S.B. decade counter 802, and a latch 808 through inverter 807. The BCD outputs from the said counters 801, 802 serve to drive seven-segment decoders 803, 804 thereby driving the associated displays 821, 822 through ballast resistors 805A through 805G. The said counters 801, 802 can only count "0" through "99". The next count after "99" returns the counters to "00". However the logic (1) to (0) transistion of the (D) output line on counter 802 is connected so as to clock the "D" flip-flop 808 causing the "Q" output to go logic (0) thereby turning ON PNP transistor 810 through base resistor 809. The result is the "b" and "c" segments of a seven-segment display 823 will be lit through ballast resistors 811, 812 to cause the display group 82 to read "100". The "Q̄" output on flip-flop 808 is now logic (1) causing the output 616 of OR gate 617 to be logic (1) thereby disabling OR gates 614, 615 and preventing any further count advancement of the counters 801, 851.

The tally wrong input CB results in a logic (00) on OR gate 614, therefore producing a logic (0) pulse on the CLOCK input of L.S.B. decade counter 851. The counter advances one count on the negative edge. The said L.S.B. counter is cascaded with a M.S.B. decade counter 852 and a latch 858 through inverter 807. The BCD outputs from the said counters 851, 852 serve to drive seven-segment decoders 853, 854 thereby driving the associated seven-segment L.E.D. displays 871, 872 through ballast resistors 855A through 855G, and 856A through 856G. The said counters 851, 852 can only count "00" through "99". The next count after "99" returns the decade counters to count "00". However the logic (1) to (0) transistion of the (D) output line on counter 852 is connected so as to clock the positive edge triggered "D" flip-flop 858 causing the "Q" output to go logic (0) thereby turning ON PNP transistor 860 through base resistor 859. The result is the "b" and "c" segments of display 873 will be lit through ballast resistors 861, 862 to cause the display group 87 to read "100". The "$\overline{Q}$" output on said plif-flop 858 is now logic (1) causing the output 616 of OR gate 617 to be logic (1), thereby disabling OR gates 614, 615 and preventing further count advancement of the counters 801, 851.

Initialization or master reset is accomplished by a logic (0) on input line DA which is inverted 413 and employed to reset the decade counters 801, 802, 851, 852 and to preset the "D" flip-flops 801, 858. When preset the said flip-flops 801, 858 are in the state where $(Q=0; \overline{Q}=1)$.

The particular decoder drivers 803, 804, 853, 854 I have demonstratively employed serve to SOURCE current. Therefore, the displays I have chosen are seven-segment L.E.D. types with a common cathode configuration which is grounded.

FIG. 8 shows the circuit changes for a variation of my display tally circuit which limits the problem entries to one-hundred, resulting in a direct percentile RIGHT and WRONG reading on respective displays 82, 87. Operation is such that two additional decade counters 620, 621 are used which are CLOCKED once by the output of AND gate 618 for each pulse inputed to either L.S.B. counters 801, 851. After counters 620, 621 count "99" times the "D" line on counter 621 will transistion from logic (1) to logic (0) as the counters return to the "00" count state on the one-hundredth clock pulse input. The said (1) to (0) logic transistion is inverted 622 and clocks the positive edge triggered "D" flip-flop 623. The logic (1) state on the "D" input transfers to the "Q" output line and inputs to OR gates 614, 615 whereupon the said OR gates are disabled. The "$\overline{Q}$" output of the said "D" flip-flop turns on transistor 625 through base resistor 624 which accordingly turns on "OVER" light 627 through ballast resistor 626 giving the student an indication that he has run one-hundred problems and the set is complete.

FIG. 9 is a partial circuit diagram showing the detail of the Darlington connected phototransistor input sensor. As shown for the "A" input, but equally applicable to the other inputs, the photo-transistor 130 is Darlington connected to a second transistor 130B. The output is on line 150X to inverter 150.

FIG. 10 is a cross sectional view of the input sensor assembly. An insulating circuit board 170, as for example a printed circuit board, contains the various input sensor components including phototransistors 130 through 145, Darlington transistors 130B through 145B, and resistors 147A through 147H together with 148A through 148H. A second circuit board contains the light emitting diodes 130A through 145A. The two circuit boards are assembled in a sandwich-like arrangement with screw 174 holding the assembly together including case top 172 and spacer 173. The problem card 101 is shown inserted. The dotted line between the L.E.D. 130A and the phototransistor 130 is indicative of the light coupling path.

FIG. 11 is a top figurative view of the input sensor assembly 11A. This top view shows the ordered arrangement of the phototransistors 130 through 145, while the area generally delineated as 15 includes the Darlington transistors, resistors, and related circuit components.

FIG. 12 shows an alternative input sensor array employing retroreflective sensors 180A through 180H, and 180'A' through 180'D', and also 180"E' through 180"H'. In this case, the sensors illuminate and view the problem card 10A and answer cards 20A, 25A from the same side.

FIG. 13 shows the variation of the problem card 10A and answer cards 20A, 25A prepared for use with the retroreflective sensors. Instead of holes in the card, as earlier described, the cards 10A, 20A, 25A have the logic (1) condition denoted by an opaque, non-reflective band or area 101A, 102A, 105A, 107A, 201A, 202A, 251A, 253A in the example.

FIG. 14 is a partial diagram showing how the retroreflective sensor 180 is effected. A light emitting diode 183 illuminates 184A the card surface 102. The reflected energy 184B is sensed by a Darlington phototransistor 181, 182. So long as the card surface 102 is reflective, the transistors will conduct. On the other hand, should a non-reflective band, such as 101A, appear on the card surface then no reflection will occur and the photosensor 181 will not conduct.

FIG. 15 is a partial diagram showing the interface of the input sensor 180 with my preferred embodiment processing logic unit of FIG. 6. The phase, or polarity, of the resultant logic is provided for in this circuit to produce the same phasing, or logic sense, as would be provided by the input sensor arrangement shown in FIG. 5. The photodarlington transistor 181, 182 has the collector tried to $+V_{cc}$ source. The emitter is tied to ground through load resistor 185, and for this example the juncture of the emitter and the said resistor 185 inputs to inverter 150, producing thereby an AA output signal of proper phase. In this arrangement, it is preferred that the plane back of the card be made reflective so as to cause the retroreflective sensors to produce all logic (1) levels when the problem and answer cards are withdrawn from the machine in order to effect the next problem-set reset function.

FIG. 16 is an auxilliary circuit providing for a positive indication 830 to the student that he has entered a "correct" answer. Operation is such that the next set logic reset line DB initializes a memory latch 826, 827. The result is a logic (1) on the output of latch gate 827, which results in transistor 829 not conducting. When a correct answer is entered into my didactic machine and checked, a logic (1) pulse will appear on line CA, which is subsequently inverted 825 and changes state in memory latch 826, 827. The resulting logic (0) on the output of latch gate 827 causes base current to flow in transistor 829 through resistor 828. The result is the saturation of switch transistor 829 resulting in indicant lamp 830 being turned "on" through ballast resistor 831.

Figure 17:
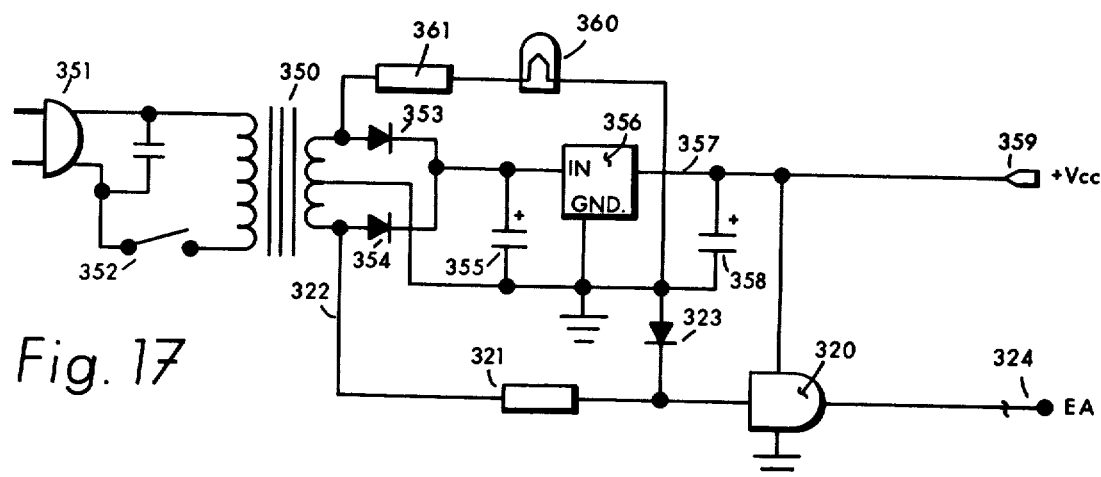
FIG. 17—Exampled primary power supply to operate preferred embodiment.

FIG. 17 is the circuit for my preferred power supply and clock pulse source. A transformer 350 operative from a source of first voltage or power line connection 351 through switch 352 provides a source of second voltage. This said second voltage is rectified by diodes 353, 354 and subsequently filtered 355. A fixed integrated circuit voltage regulator 356 is employed to provide a stabilized source 357 of $+V_{cc}$ on line 359 as developed across capacitor 358. A power-on indicator lamp 360 together with a ballast resistor 361 connects across one transformer leg to ground.

The clock pulses are effected by applying the alternating current waveform 322 appearing across one leg of the transformer secondary to ground to a logic buffer 320 through an impedance resistor 321 and a negative clamp diode 323. The result is a square wave clock pulse output 324 on line EA.

Figure 18:
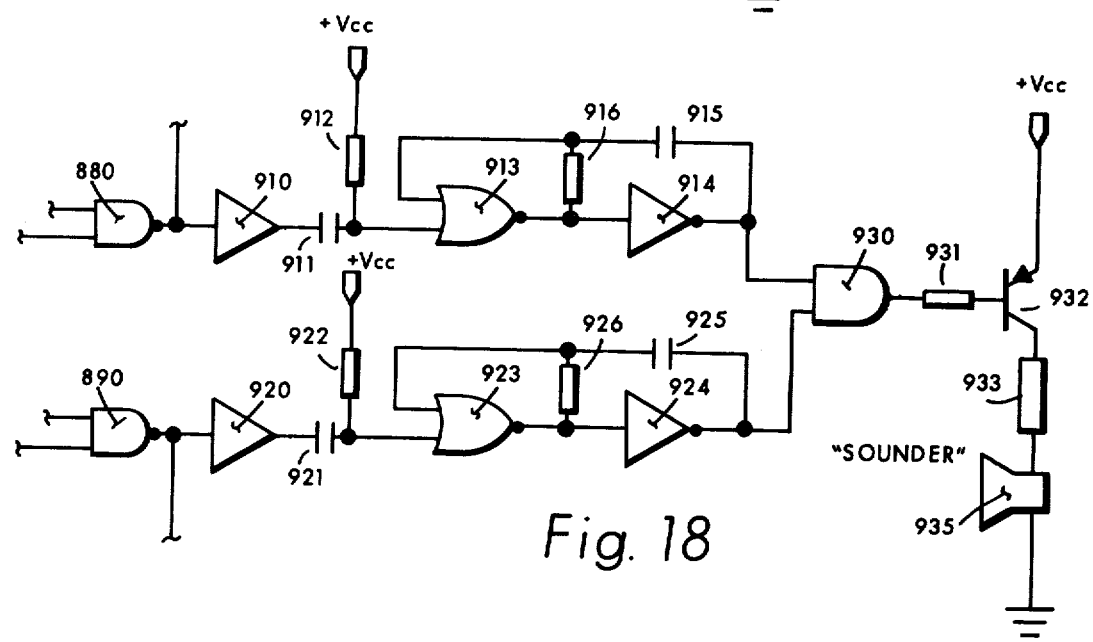
FIG. 18—Audible signalling arrangement for student tutoring.

FIG. 18 shows the circuit variation for my preferred embodiment to effect an audio response of answer correctness. In this particular form, a higher pitched note, or "beep", indicates the student's answer is "too big", while a lower pitched note indicates "too small". The tone is produced by a sounder, or loudspeaker 935. Operation is such that the logic (0) occurring on the output of said gate 880 in FIG. 6 is buffered 910. The output of the said buffer 910 falls to a logic (0) pulling down and enabling the associated input of gate 913. Gate 913 together with inverter 914, capacitor 915 and resistor 916 form a class of astable multivibrator operating at the higher audio frequency. On the other hand, should the answer be too small and the logic (0) occurs on the output of gate 890 and also buffer 920, a lower frequency oscillator consisting in the main of gate 923, inverter 924, capacitor 925, and resistor 926 will be enabled.

In either case, the enabling of gate 913 or 923 will be brief due to the charging of the respective coupling capacitors 911, 921 by associated timing pullup resistors 912, 922. The time constant of the capacitor 911, 921 and resistor 912, 922 is preferably on the order of one second.

The resultant audio frequency oscillations combine in AND gate 930 so as to serve to drive transistor 932 through base resistor 931. The collector of the said transistor 932 serves to pulse-drive loudspeaker 935 through volume limiting resistor 933.

Figure 19:
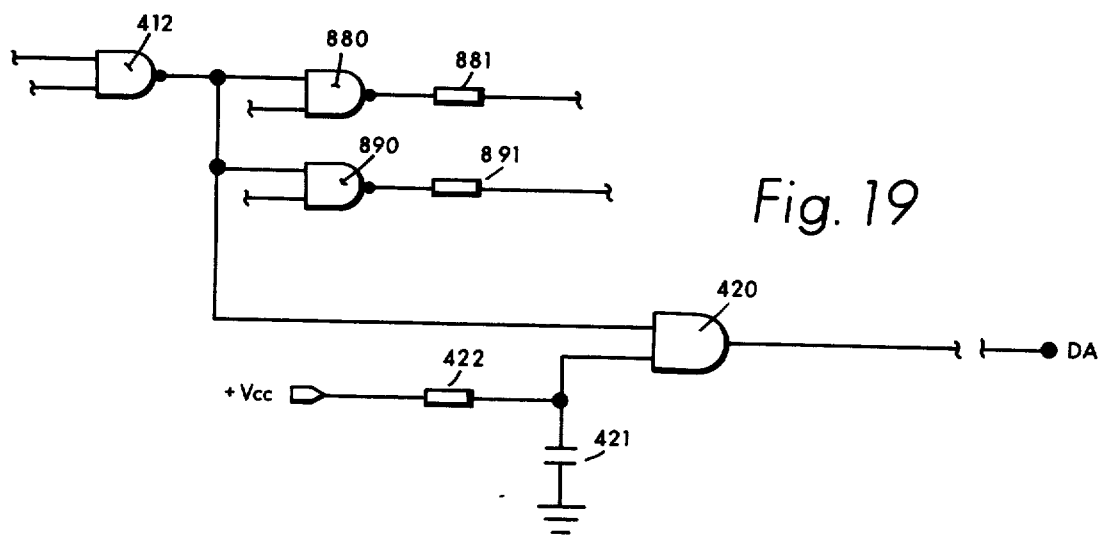
FIG. 19—"Power on" reset circuit.

FIG. 19 is the circuit variation in my preferred embodiment to provide for "power on" or "power up", e.g. automatic, reset operation. As is shown the AND gate 420 is tied into the DA reset line, which initializes all scorekeeping counters whenever a logic (0) appears on the reset line DA. An automatic reset is attained when power is first turned ON through connecting a capacitor 421 to one input of the said AND gate 420. With power OFF, the capacitor 421 will assume a zero charge. When power is turned ON, the capacitor will hold the said gate input near logic (0) until resistor 422 charges the capacitor to a logic (1) level. The time constant of resistor 422 and capacitor 421 determnes the reset pulse period, usually on the order of a few hundred milliseconds at most.

The trial answering of the problem several times, after which the "correct" answer is displayed, is depicted as a teaching method in FIG. 20. Each entry made by the "CHECK" switch 301' will produce a brief pulse at the output of a debounce circuit function provided by a retriggerable "one shot" multivibrator including gates 330, 331, 332, resistor 334, reset diode 335, and capacitor 333. The effect is to produce a single positive pulse upon switch 301' closure on line 336 which will CLOCK J-K flip-flop 340. In effect, the cross coupling of the flip-flops 340, 341 provide a divide-by-four logic function, which acts as an apparent divide-by-three machine function. The "Q" line output states represent:

| Machine State | FF 340 "Q" | FF 341 "Q" | Function |
|---|---|---|---|
| START response | 0 | 0 | START test |
| FIRST response | 1 | 0 | FIRST try |
| SECOND response | 0 | 1 | SECOND try |
| THIRD response | 1 | 1 | DISPLAY the correct answer |

The resulting advance of the counter function is decoded by gates 342, 345, 348 so as to produce a "happy-face" display corresponding to the degree of error involved in the answer entries. Therefore, if the correct answer is entered on the first try, the student will view only a "happy" happy-face. Two trials will result in a "plain" (e.g., straight mouthed) happy-face, whereas three trys lights up a "sad" happy-face display. Three attempts also is decoded as a (00) input to gate 465 resulting in the unblanking of display drivers 240, 290 which connect to the "tens" display 24' and "units" display 29' by way of resistor groups 242, 292. The inputs ABCD of each display driver connect to correspondent data lines AA through AH in FIG. 5. This provides the "correct" answer information as included in the first code identity part of the interrogation card. Inverters 241, 291 adjust the weighted binary code into a conventional BCD (binary coded decimal) code for recognition by the display drivers. When a "correct" answer is entered, the J and K inputs of the flip-flops 340, 341 are brought to a logic (0) state by the action of gate 827 in FIG. 16, the output of which goes to logic (0) when a "correct" response occurs. This inhibits further count advancement, freezing further machine response until a "reset" is accomplished by way of gate 454 in FIG. 6. The RD line in FIG. 6, as shown coupled directly to the output of gate 454 now is reconnected instead to the output of AND gate 336 when the advantages of FIG. 20 are included.

As the embodiment is depicted, the "happy" face 67A is illuminated by lamp 670 driven from gate 342 by PNP transistor 343. The "straight" face 67B is illuminated by lamp 680 driven from gate 345 by PNP transistor 346. The "sad" face 67C is illuminated by lamp 690 driven from gate 348 by PNP transistor 349.

The inclusion of the advantages described functionally in conjunction with FIG. 20 are shown included as part of the machine 1' in FIG. 21. The three "happy-face" displays 67 are viewable by the operator, while the "correct answer" display appears as digits 24", 29" which of course light only after a few attempts are made by the student to come up with the "correct" answer. The question card 10' also depicts the addition of, in the case of a mathematical problem, the written out question, e.g. "THREE TIMES EIGHT", which serves to further teach the student the correct way to verbally express the problem.

The circuit refinement depicted in FIG. 22 serves to prevent the entry of multiple "correct" scores, by blocking more than one CA signal by way of cross-coupling the CA signal with the latch circuit inherent in the circuit refinement described by FIG. 22.

While my invention is shown to use eight input sensors for the said problem card, and four input sensors for each answer card, this is not intended to in any way limit the use of a different arrangement of plural sensors together with appropriate changes in the said logic processing unit.

Even though I show my preferred embodiment using typically two answer cards, this shall not inhibit the extension of the intent of my invention to use any single or plural combination of answer cards.

While my invention shows the use of optical sensors for the purpose of resolving the encoded problem and answer information, no limitation is implied regarding the use of other known forms of sensing, together with suitable indicia.

Although the use of a particular binary code is referred to in my description, this is by way of example only, and is not to be construed as in any way limiting the application of other known binary codes to the said invention.

While my invention is shown to have particular application as a mathematical tutoring machine, this shall not infer that other application of the device is not equally suitable, as for example teaching word association through showing a picture of an object together with a plural choice of numbered name answers on the problem card which permits the student to enter the correct answer by means of a number card.

While my machine is expressed as a didactic device, it may obviously be extended to perform as a game-like entertainment device.

While my invention has been shown to use particular types of semiconductors and integrated circuits as function and gain devices, it shall be understood that a person skilled in the art could duplicate the same functions from built-up circuits consisting of individual components arranged in myriad combinations, or with other combinations of integrated circuits.

The elements comprising my said didactic apparatus, when properly coupled to each other, have been shown to operate successfully as herein described utilizing the following key components and component values:

| | |
|---|---|
| comparator 511, 512 | CD4063BE |
| flip-flop 312, 313, 808, 858, 623 | CD4013BE each |
| flip-flop 340, 341 | CD4027BE each |
| counter 801, 802, 851, 852, 620, 621 | CD4518BE each |
| decoder 803, 804, 853, 854, 240, 290 | CD4511BE |
| display 821, 822, 823, 24', 29' | MAN-54A |
| display 871, 872, 873 | MAN-74A |
| regulator 356 | $\mu$A-7808 |
| sensor (retroreflective) 180 | MCA-7 (Monsanto) |

Standard C-MOS, or other type of logic, integrated circuits can satisfy the various gate and inverter requirements. The foregoing parameters and values are given by way of example only to assist a person of average skill in the art to duplicate a model of my invention for experimental purposes only, and are not intended to limit in any way the scope of my invention.

Having thus described my invention in terms of a preferred embodiment thereof, which is set forth in some detail, it should be understood that this is by way of illustration only of the practicability of my disclosed device and that the invention is not necessarily limited thereto. Alternative embodiments and operating techniques will become apparent to those skilled in the art in view of my disclosure and, accordingly, it is contemplated that modifications can be made in the apparatus without departing from the spirit of the described invention.

What I claim is:

1. Didactic means adapted for providing essentially a disjunctive problem entry and answer response entry effect thereby providing a student directed learning experience, comprising in operative combination:

i. a set of substantially planar interrogative elements with each element therewith provided individually having thereon at least a first symbolic stimuli which is presented as an effectively visible problem to the student for tutorial consideration, together with a first cryptogrammic code identity corresponding to the said first symbolic stimuli which is machine readable by noncontiguous means and results in an effective indication of the requisite student response;

ii. a set of substantially planar responser elements with at least one element selectable therefrom having second symbolic stimuli presented thereon which substantially serves as an effectively visible answer component which is correlative with the said individual interrogative element problem put to the student, together with a second cryptogrammic code identity corresponding to the said second symbolic stimuli which is machine readable by noncontiguous means and results in an effective indication of the response selection;

iii. an interrogative element sensor station means comprising a substantially separate stationary sensing element means for each cryptogrammic code element which is effectively recipient for the purpose of converting the said first cryptogrammic code identity representations on the said interrogative element into a plurality of effectively parallel first functional electical signals;

iv. a responser element sensor station means comprising a substantially separate stationary sensing element means for each cryptogrammic code element which is effectively recipient for the purpose of converting the said second cryptogrammic code identity representations on at least one said responser element into a plurality of effectively parallel second functional electrical signals;

v. processing logic means arranged as an effectual combination of electrical devices suited for the correlative manipulation and comparison of the said first and said second functional electical signals effectively coupled thereto as provided by the said sensor station means; and, vi. indication means coupled with the said processing logic unit to signal and thereby score the student as to the exactitude of his/her selected responser element answer.

2. Didactic means as in claim 1 wherein the said planar elements comprise a card-like supportive medium, upon which the said symbolic stimuli and the associated cryptogrammic stimuli are supported essentially by at least one surface thereof, having been mechanically applied thereto.

3. Didactic means as in claim 1 wherein the said planar elements comprise a card-like supportive medium, upon which the said symbolic stimuli is supported essentially by at least one surface thereof, having been mechanically applied thereto; and wherein further the said cryptogrammic stimuli is provided as a unique combination of aperture arrangements effected through the element substance.

4. Didactic means as in claim 1 wherein each said first and second cryptogrammic code identity is produced through the combination of a plurality of arrangements for the element supported sensor station decipherable impressions, each of which serves to act upon an independent sensor element so as to produce electrical signals at the said processing logic means.

5. Didactic means as in claim 1 wherein each said sensor station is arranged in a supportive structure so as to permit the student to view the said first and second symbolic stimuli concurrent with each of the said sensor stations effecting a conversion of the said first and second cryptogrammic code identity representations into corresponding first and second functional electrical signals.

6. Didactic means as in claim 1 wherein the said sensor station means are each responsively operative to recognize the said first and said second cryptogrammic code identity as effectively separate binary signal patterns.

7. Didactic means as in claim 1 wherein the said first and second cryptogrammic code identities are converted into effectively separate functional electrical signals through the use of photoreceptor means.

8. Didactic means as in claim 1 wherein on each the said interrogative element means and the said responser element means the said first and second cryptogrammic code identity is effected so as to alternatively serve to interrupt and sustain the effective light path between a light source means and a cooperative photo receptor means provided in each said sensor station means in accordance with the predetermined said cryptogrammic code pattern.

9. Didactic means as in claim 8 wherein said photoreceptor is a solid state detector, while the said light source is a light emitting diode, thereby effecting a combination which responds separately with each indicia element of the said first and second cryptogrammic code identity so as to produce a parallel acting plurality of separate functional electrical signals having several distinct values, with each value indicative to the said processing logic means as to the binary value significance of the correspondent said indicia element.

10. Didactic means as in claim 1 wherein each said first and second cryptogrammic code identity comprises a plurality of arrangements of apertures in the said element means through which the said sensor means may effectively respond.

11. Didactic means as in claim 1 wherein said processing logic means includes memory means coupled with and coacting so as to store, and subsequently retrieve, the response determinations as resolved by the said processing logic means.

12. Didactic means as in claim 1 wherein the said processing logic unit means includes a check logic strobe signal source selectively actuatable by the student and operative with the said functional electrical signals so as to substantially compare the said first cryptogrammic code identity with the said second cryptogrammic code identity, thereby effecting a check as to the correctness of his/her response when he/she is satisfied with the selection of one or more responser elements he/she has inserted into the machine's input sensor station means.

13. Didactic means as in claim 1 wherein the said processing logic unit means includes a next problem entry reset signal which serves to advance the operative status of the apparatus combination inpreparation for the entry of the next of a series of problems in a problem set, wherein said reset signal is accomplished when all of the interrogative and responser element entries are effectively removed from the said sensor station means.

14. Didactic means of claim 1 including indication means wherein the relative number of correct and incorrect responses made by the student is exhibited on a numerical digital display.

15. Didactic means of claim 1 including indication means wherein sensory stimuli is provided which is effectively indicative of the student's response disparity.

16. Didactic means of claim 1 including indication means wherein percentage of correctness of the student's responses, upon completion of a particular problem set series, is exhibited on a numerical digital display.

17. Didactic means as in claim 1 wherein the said processing logic unit means further provides for the successional trial answering of the problem for several times by the student, after which the "correct" answer is displayed if no correct answer is successfully entered by the student after the several allowed trials.

18. Didactic means as in claim 1 wherein the said processing logic unit means further provides for the successional trial answering of the problem for several times by the student, and further where each trial answer attempt which is incorrectly entered for a given problem operates to effect a display means which serves to admonish the student's error through increasing reproof values.

19. Didactic means as in claim 1 wherein a confirmatory display means is provided which couples to the responser element sensor station means so as to provide a visual verification of the responser element entry into the coactive sensor station.

* * * * *